April 22, 1947. E. A. KELLER 2,419,451
ADJUSTABLE SPIRIT LEVEL
Filed Oct. 5, 1944 2 Sheets-Sheet 1
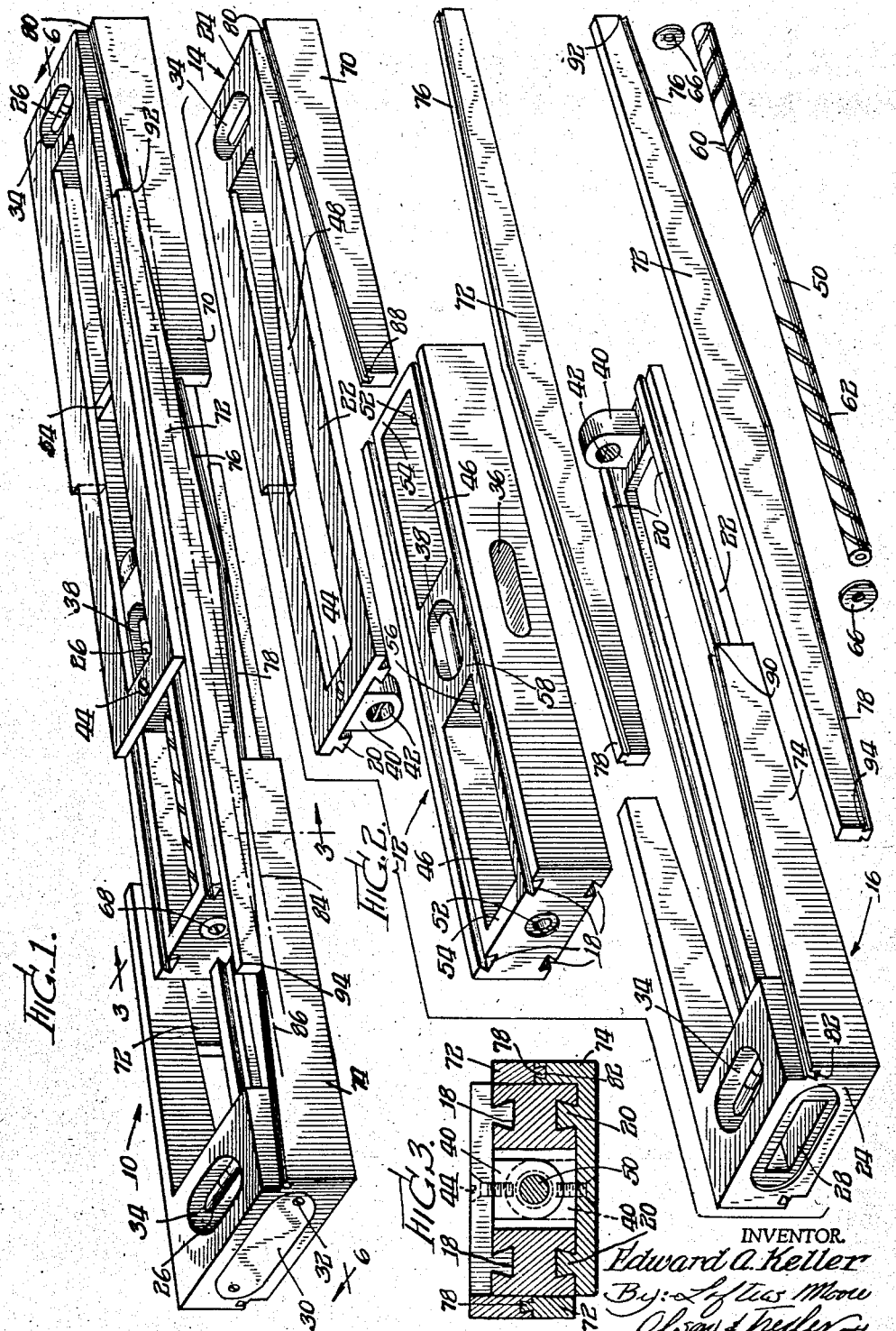
INVENTOR.
Edward A. Keller

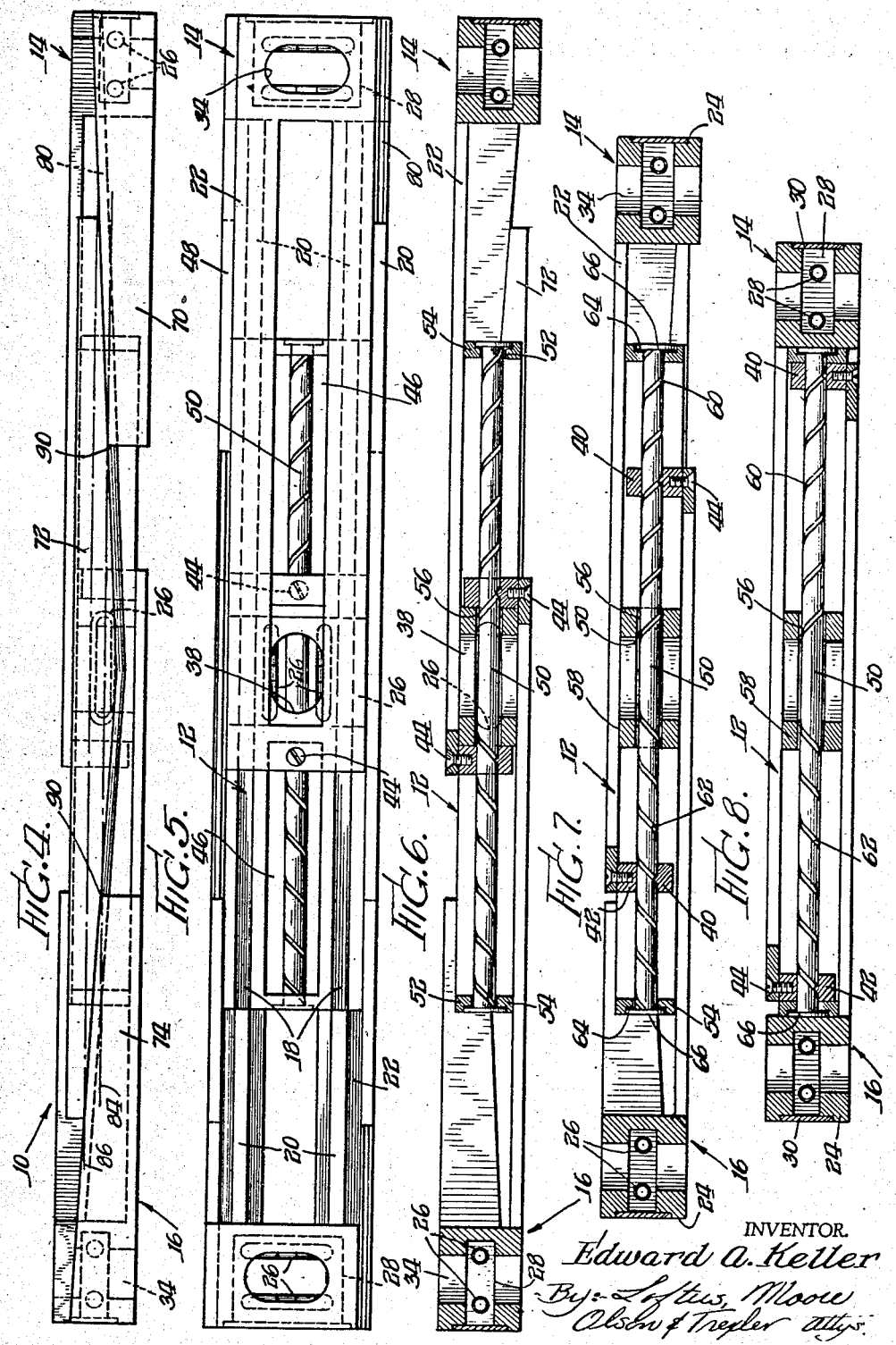

Patented Apr. 22, 1947

2,419,451

UNITED STATES PATENT OFFICE 2,419,451

ADJUSTABLE SPIRIT LEVEL

Edward A. Keller, Aurora, Ill.

Application October 5, 1944, Serial No. 557,254

7 Claims. (Cl. 33—208)

This invention relates to adjustable or expansible devices. More particularly it relates to an expansible spirit level.

Adjustable or expansible spirit levels as well as other adjustable or expansible devices are well known in the art. The adjustable or expansible spirit levels heretofore known, however, have been subject to several disadvantages. Among these an outstanding one is that when drawn out or expanded beyond their minimum length the straight or flat edges are not continuous so that while serving to indicate whether a particular line or surface is horizontal or vertical they are not suitable to indicate at the same time that the surface is plane or that the line is perfectly straight. Thus when applied to a timber, for example, they will indicate whether the two points against which their ends rest are vertically or horizontally aligned, but will not show whether or not the intermediate points lie on a straight line connecting the two end points since they do not in their expanded state provide a continuous straight edge. In like manner when employed by a plasterer, for example, they will indicate whether two points on a corner are vertically one above the other but will not indicate whether the intermediate points are in line with these two so that the corner is perfectly straight and vertical.

Also such spirit levels and other expansible devices have also suffered from the disadvantage that when provided with expansible means on either end or either side it is difficult to draw these expansible means out to equal distances so that the device such as the spirit level remains symmetrical about the midpoint. In view of these disadvantages, expansible devices, particularly expansible spirit levels, have not enjoyed the commercial success which they might have otherwise and have not satisfied the demand for satisfactory expansible devices, particularly expansible spirit levels.

It is therefore an object of this invention to provide an expansible device having a continuous straight edge substantially throughout its length and in any position to which it is expanded or contracted.

A more specific object is to provide an expansible spirit level having a continuous straight edge substantially throughout its length and in any position to which it is expanded or contracted.

A still further object is to provide an expansible spirit level which may be drawn out or expanded on both ends and which in any position to which it is expanded or contracted has in the plane of the spirit bubble tube a continuous straight edge substantially throughout its length.

Still another object is to provide an expansion device adapted to be expanded in opposite directions and which when so expanded remains substantially symmetrical about its midpoint in completely contracted position.

A still more specific object is to provide an expansible spirit level adapted to be expanded on both ends and which when so expanded remains substantially symmetrical about its midpoint in completely contracted position.

Another object is to provide an expansible spirit level adapted to be expanded on both ends which when so expanded remains substantially symmetrical about its midpoint in completely contracted position and which in any position to which it is adjustable provides a continuous straight edge substantially throughout its length.

Other objects will be apparent hereinafter.

In order that the invention may be better understood reference is made to the accompanying drawing forming a part of this specification which indicates how the foregoing objects may be accomplished and in which Figure 1 is a view in perspective of an expansible spirit level embodying features of the present invention, showing the device in completely expanded position;

Figure 2 is an exploded view in perspective showing the various parts which form the spirit level illustrated in Figure 1;

Figure 3 is a section on the line 3—3 in Figure 1;

Figure 4 is a view of one edge of the spirit level shown in Figure 1;

Figure 5 is a view in elevation of the level shown in Figure 1;

Figure 6 is a section on the line 6—6 in Figure 1;

Figure 7 is a view similar to Figure 6 showing the level in partially expanded position; and Figure 8 is a view similar to Figure 6 showing the level in completely contracted position.

Referring now more particularly to Figures 1 and 2, it is seen that the adjustable level designated generally 10 is formed largely of three parts, that is a central body portion 12 and a pair of complementary end members 14 and 16. The end members 14 and 16 are slidingly mounted upon the body portion 12 by means of grooves 18 in the body 12 and cooperating tongues 20 on members 14 and 16. The cooperating tongues 20 and grooves 18 serve to guide the members 14 and 16 during expansion and contraction and when well-made retain the members 14 and 16 in perfect alignment with each other and with the body 12 in any position to which the level 10 is adjusted.

The tongues 20 of members 14 and 16 are formed on frames 22 extending inwardly from bubble tube boxes 24 forming the ends of the members 14 and 16. Each of the boxes 24 carries a pair of the usual bubble tubes 26 which are mounted in openings 28 formed centrally in the boxes. In constructing the level 10 suitable supporting material such as plaster of Paris is positioned in the openings 28 and the bubble tubes 26 are then mounted in the plaster of Paris support. Cover plates 30 are provided to close the ends of openings 28. These are secured in any suitable manner, as, for example, by means of bolts or screws 32. An opening 34 extending between the opposite faces of each box 24 is provided so that the bubble tubes may be seen. Means including an opening 36 is also provided in body portion 12 for mounting a pair of bubble tubes 26 centrally therein. In the manner above described, suitable mounting material such as plaster of Paris is positioned in the opening 36 and the bubble tubes 26 are mounted therein in position as shown in Figure 5. Opening 38 extending through the central portion of body 12 permits the central bubble tubes 26 to be viewed from either face of the level 10. It will be apparent that these two central bubble tubes 26 being positioned as indicated in Figure 5 are read when the level is extended in horizontal position and that the bubble tubes 26 in boxes 24, being positioned at right angles to those in the center as is also shown in Figure 5, are read when the level is extended vertically.

To keep the level symmetrical about the central bubbles 26 in any position to which it may be adjusted, lugs 40 provided with threaded openings 42 are screwed or bolted on the inner ends of frames 22, by screws or bolts 44, for example. These lugs 40 reciprocate in generally rectangular openings 46 provided in the body 12. As is apparent the Figure 1, the frame members 22 carrying lugs 40 extend in beyond the adjacent opening 46 and center portion of body 12 so that lugs 40 are positioned in the opening 46 remote from the extension 14 or 16 of which they form a part. In this connection it is also pointed out that a long narrow opening 48 is provided in each frame 22 to permit the central bubble tubes 26 to be seen when frames 22 are in position since these frames would otherwise obscure these bubbles 26. The lugs 40 in the openings 46 are threadingly received on the opposite ends of a threaded rod 50 extending through openings 52 provided centrally in the ends 54 of body 12 and through an opening 56 extending centrally and longitudinally through the central portion 58 of body 12 which carries the central bubble tubes 26. The rod 50 is loosely received in openings 52 and 56 to permit it to rotate therein for a purpose which will hereinafter become more apparent. The threads 60 and 62 extending in from the opposite ends of rod 50 to points adjacent the center are oppositely pitched. The threads 42 in the lugs 40 are correspondingly oppositely pitched on end members 14 and 16. It will be apparent that as a result of this arrangement rotation of rod 50 in one direction will cause the lugs 40, and thus the end pieces 14 and 16 to which they are secured, to move in opposite directions. Consequently the end pieces 14 and 16 will both be moved out or both be moved in at the same time and by reason of the fact that the threads 60 and 62 are equally pitched the members 14 and 16 will necessarily move in or out the same distances.

Although means may be provided for turning the rod 50 by hand such operation of the level 10 shown in the drawings herein is not contemplated. Instead the threads 60 and 62 are given a substantial pitch on the order of 45° whereby the rod 50 is caused to turn by forcing the ends 14 and 16, or both, inwardly or outwardly with respect to the body 12. It will further be apparent that by reason of the fact that the ends 14 and 16 are both threadingly mounted on the rod 50 it is possible to expand the level or contract it by exerting suitable force on either of the end members 14 or 16, the other being necessarily moved by the turning of the rod 50.

It will be understood that the so-called threads 60 and 62 will not necessarily be V grooves, and in fact might better be referred to as helical grooves than as threads. In any event such variations are within the scope of the invention. Also, instead of providing a thread within the lugs 40 other means engaging in the helical grooves or threads 60 and 62, such as a small pin, may be employed.

To secure the rod 50 against longitudinal movement circular depressions 64 are formed in the ends 54 of body 12 about the openings 52 to receive washers or caps 66. These washers or caps 66 are bolted to the ends of rod 50 by bolts 68. The washers or caps 66 turn with the rod 50 and accordingly the depressions 64 are made large enough and deep enough to permit these caps 66 to turn freely therein.

To provide a continuous straight edge extending substantially the full length of the level 10, sets of three wedge members 70, 72 and 74 are provided on each edge of the level 10. The wedge members 70 and 74, as shown, are preferably secured to or formed integral with the ends 14 and 16 respectively. The central wedge member 72 which cooperates with the end members 70 and 74 is slidably mounted on the cooperating members 70 and 74 by means of tongues 76 and 78 on member 72 and cooperating grooves 80 and 82 formed respectively on wedges 70 and 74. The tongue and groove connection between wedge members 70, 72 and 74 permits wedges 70 and 74 to move longitudinally with respect to wedge 72 and at the same time moves wedge 72 laterally to retain it in contact with members 70 and 74. In this manner a continuous straight edge extending the full length of the level 10 is continuously maintained on each edge of level 10 along surfaces (Figures 1 and 4) lying between broken line 84 and broken line 86. It will be understood of course that these lines 84 and 86 shift laterally with respect to the level 10 as the level is expanded and contracted, their position at any time being determined respectively by corners 88 and 90 and corners 92 and 94 of wedges 70, 72 and 74 (Figure 2).

As shown in the drawings the sets of wedges 70, 72 and 74 are oppositely positioned on the two edges of the level 10, that is, the wedge 72 on one edge is adjacent one face and the wedge 72 on the other edge is adjacent the opposite face. Obviously, of course, both wedges 72 may be adjacent the same face if desired. Similarly, the central wedge member 72 may, for example, be slidably mounted on the central body portion 12 instead of by means of the tongues and grooves 76, 78, 80 and 82, or it may be fixed thereon and the end wedges 70 and 74 may be slidably mounted on the extensions 14 and 16, the slidable wedge or wedges in both cases preferably being resiliently urged into contact with the cooperating wedge or wedges or connected by means such as tongues and grooves as shown.

Likewise, a variety of other modifications may be made in the structure, as will be apparent to those skilled in the art, without departing from the spirit and scope of the invention. Thus, by way of illustration, various parts, such as the ends 14 and 16, are shown as integral members, whereas if desired the elements of these parts may be formed separately and suitably secured together. Also, the tongue and groove construction by which the various parts are slidably engaged with each other may be replaced with other equivalent means. It will be apparent, however, that since the level 10 is a precision instrument, or at least is preferably constructed to be, it is desirable that the parts be engaged in such manner as to ensure that they will be at all times retained in their proper relationship to each other.

The various parts of the level 10 may be constructed from a variety of different materials. Where a high degree of precision is desired, some relatively strong, long-wearing material, such as a light metal, a plastic, or a hard wood will be indicated. It is within the scope of the invention, however, to construct the level of any desired material.

The advantages of this level are apparent from the foregoing description. Rod 50 and cooperating lugs 40 serving to retain the ends 14 and 16 at all times at equal distances from the center of body 12 have the advantage of keeping the level 10 symmetrical at all times about the central bubble tubes 26 which is an important feature of the level. This is moreover accomplished automatically and without requiring any special attention on the part of the user. A further outstanding advantage of the level is that by reason of the cooperating wedge members a continuous straight edge is maintained on each edge of the level at all positions to which it is adjustable. Thus it is possible, whether the level is extended or contracted, to determine readily whether a given line or surface lying between the ends of the level is either perfectly vertical or perfectly horizontal throughout its length. The level disclosed herein thus possesses the advantages and properties of levels which are not extensible and at the same time may be extended or contracted depending upon whether the use to which it is put requires a long or short level. This is accomplished, moreover, without any substantial variation in the accuracy of the level due to the fact that it is at all times symmetrical about the center bubbles and due to the further fact that the bubbles which are used when the level is held vertically are at all times located substantially at the extreme ends of the level.

It is apparent that many widely different embodiments of this invention may be made without departing from the spirit and scope thereof and therefore it is not intended to be limited except as indicated in the appended claims.

I claim:

1. A spirit level comprising a body carrying a spirit bubble tube and an expansible device comprising in combination means permitting expansion and contraction thereof and means for maintaining in the plane of said spirit bubble tube at least one continuous straight edge thereon during expansion and contraction extending substantially the full length of the device including at least two cooperating wedge members, said means permitting expansion including portions of said device movable with respect to each other, one of which carries one of said wedge members and the other of which carries another, at least one of said wedge members also being supported for shifting to maintain engagement with said other wedge member during expansion and contraction.

2. An expansible spirit level comprising in combination means permitting expansion and contraction thereof and means for maintaining at least one continuous straight edge thereon during expansion and contraction extending substantially the full length of the spirit level including at least two cooperating wedge members, said means permitting expansion including portions of said spirit level movable with respect to each other, one of which carries one of said wedge members and the other of which carries another, at least one of said wedge members also being supported for shifting to maintain engagement continuously with said other wedge member during expansion and contraction.

3. An expansible spirit level comprising means for expanding and contracting the same longitudinally including a pair of extensions slidably mounted upon the opposite ends of a central member carrying a bubble tube, and means for maintaining in the plane of the bubble tube a continuous straight edge on said level extending substantially the full length of said level at all positions to which said extensions are adjustable comprising a pair of wedge members mounted respectively on said extensions and a third wedge member supported intermediate said pair of wedge members and cooperating with said pair of wedge members, at least one of said three wedge members being shiftably mounted to permit shifting thereof during expansion and contraction and said wedge members having means associated therewith for maintaining said wedge members in cooperative relation during expansion and contraction.

4. An expansible spirit level comprising means for expanding and contracting the same longitudinally including a pair of extensions slidably mounted upon the opposite ends of a central member carrying a bubble tube, and means for maintaining in the plane of the bubble tube a continuous straight edge on said level extending substantially the full length of said level at all positions to which said extensions are adjustable comprising a pair of wedge members mounted respectively on said extensions and a third wedge member supported intermediate said pair of wedge members and cooperating with said pair of wedge members, said pair of wedge members being rigidly mounted on said extensions and said third wedge member being slidably secured along its edge surfaces to the edge surfaces of said end wedge members.

5. An adjustable spirit level comprising means for expanding and contracting the same longitudinally including a pair of extensions slidably mounted on the opposite ends of a central member, a bubble tube mounted on said central member, means for maintaining in the plane of said bubble tube a continuous straight edge on said level extending substantially the full length of said level at all positions to which said extensions are adjustable, and means for causing said expansion and contraction to be uniform with respect to the longitudinal center of said central member, said means for maintaining the continuous straight edge including a pair of wedge members mounted respectively on said extensions and a third wedge member supported intermediate said pair of wedge members and cooperating with said pair of wedge members, at least one of said wedge members being shiftably mounted to permit shifting thereof during expansion and contraction and said wedge members having means associated therewith for maintaining said wedge members in cooperative relation during expansion and contraction and said means for causing said expansion and contraction to be uniform including means held against longitudinal movement with respect to the center of said central member, having right and left hand threads on opposite ends thereof and threadingly engaging on its opposite ends said pair of extensions.

6. An adjustable spirit level comprising means for expanding and contracting the same longitudinally including a pair of extensions slidably mounted on the opposite ends of a central member, a spirit bubble tube mounted on said central member, means for maintaining in the plane of said bubble tube a continuous straight edge on said level extending substantially the full length of said level at all positions to which said extensions are adjustable and means for causing said expansion and contraction to be uniform with respect to the longitudinal center of said central member, said means for maintaining the continuous straight edge including a pair of wedge members mounted respectively on said extensions and a third wedge member supported intermediate said pair of wedge members and cooperating with said pair of wedge members, said pair of wedge members being rigidly mounted on said extensions and said third wedge member being slidably secured along its edge surfaces to the edge surfaces of said end members, and said means for causing said expansion and contraction to be uniform including means held against longitudinal movement with respect to the center of said central member, having right and left hand threads on opposite ends thereof and threadingly engaging on its opposite ends said pair of extensions.

7. An expansible spirit level as described in claim 6 further characterized in that the two wedge members are slidably secured to the third wedge member and the two extensions are slidably secured to the central member by tongue and groove connections.

EDWARD A. KELLER.

REFERENCES CITED

The following references are of record in the file of this patent:

UNITED STATES PATENTS

| Number | Name | Date |
|---|---|---|
| 1,544,153 | Holmgren | June 30, 1925 |
| 1,848,003 | Chalupny | Mar. 1, 1932 |
| 948,777 | Tuomi | Feb. 8, 1910 |
| 1,887,266 | Karlson | Nov. 8, 1932 |
| 1,745,270 | Raphael | Jan. 28, 1930 |
| 184,139 | Bronson | Nov. 7, 1876 |
| 2,242,116 | Donaway | May 13, 1941 |
| 293,647 | Getty et al. | Feb. 19, 1884 |